United States Patent
Sato

(10) Patent No.: US 6,747,816 B2
(45) Date of Patent: Jun. 8, 2004

(54) WIDE-ANGLE, SINGLE FOCUS LENS

(75) Inventor: Kenichi Sato, Ageo (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 118 days.

(21) Appl. No.: 10/076,328

(22) Filed: Feb. 19, 2002

(65) Prior Publication Data

US 2002/0196564 A1 Dec. 26, 2002

(30) Foreign Application Priority Data

Mar. 29, 2001 (JP) ........................................ 2001-095178

(51) Int. Cl.⁷ ................................................. G02B 9/34
(52) U.S. Cl. ...................... 359/781; 359/715; 359/753
(58) Field of Search ........................... 359/771, 781, 359/763, 770, 761, 754–756, 713–715, 749–753

(56) References Cited

U.S. PATENT DOCUMENTS 5,684,635 A * 11/1997 Sugawara .................... 359/643
6,088,172 A * 7/2000 Sato ............................ 359/770
6,414,802 B1 * 7/2002 Betensky ..................... 359/753

FOREIGN PATENT DOCUMENTS

JP  2000-180719  6/2000

* cited by examiner

Primary Examiner—Jordan M. Schwartz
(74) Attorney, Agent, or Firm—Arnold International; Bruce Y. Arnold

(57) ABSTRACT

A wide-angle, single focus lens is disclosed that is formed of four lens elements of negative, positive, negative, and positive refractive power, in sequential order from the object side. The first lens element is concave on its object side, the second lens element has at least one surface that is aspheric, and the fourth lens element is convex on its image side and has at least one surface that is aspheric. Specified conditions are preferably satisfied in order to reduce aberrations and provide a bright image while maintaining a short overall lens length.

3 Claims, 4 Drawing Sheets

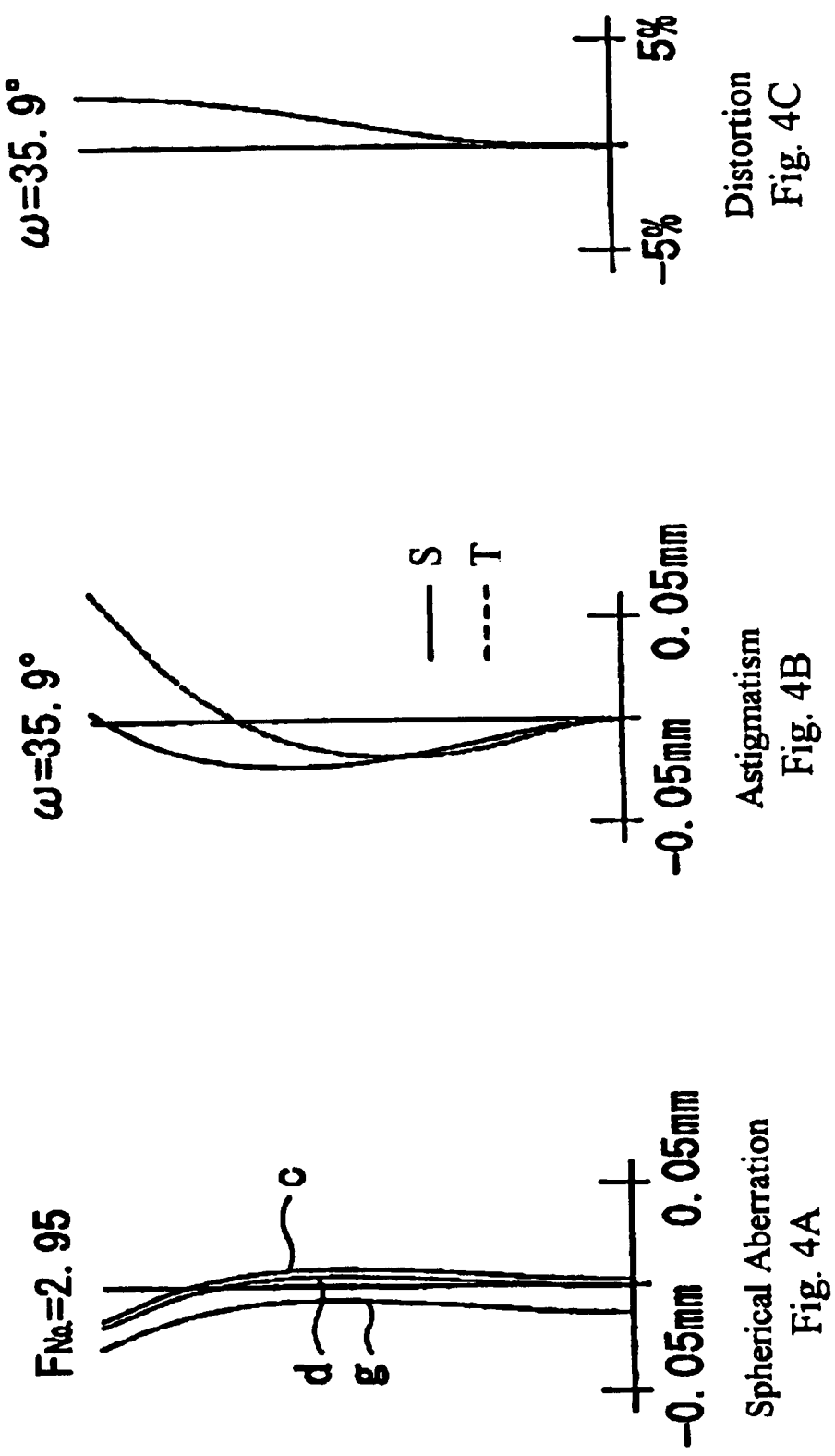

WIDE-ANGLE, SINGLE FOCUS LENS

BACKGROUND OF THE INVENTION

Recently, digital cameras which photograph an object using a solid-state image sensing device such as a CCD (Charge Coupled Device) array in lieu of a silver-salt film are becoming popular. As for digital cameras in general, still cameras exist for still photography and video cameras exist for motion picture photography.

Recently, miniaturization of CCD elements has been progressing rapidly, and this miniaturization has caused a demand for photographic lenses that have a shorter overall length and a simple construction. A conventional photographic lens for a digital camera is described, for example, in Japanese Laid Open Patent Application No. 2000-180719. This publication discloses photographic lenses of five-piece and of four-piece construction. However, conventional photographic lenses, including the lens described in this publication, are still insufficient in terms of simplicity of construction and shortness of overall length.

In addition, one cannot say that photographic lenses developed thus far for digital cameras have excellent performance, especially in terms of the wideness of the angle of view. This is because, when the photosensitive element is a CCD array rather than a silver-salt film, there is a restriction in the angle of view due to a loss of detector efficiency that occurs with CCD detectors when the incident rays are non-normal to the image surface of the detector. For example, the lens described in the above-mentioned patent publication, when scaled for a camera using standard 35 mm film, would have a focal length of 40 mm. On the other hand, a wide-angle lens for standard 35 mm film typically has a focal length of about 28 mm. Thus, there remains a high demand for development of a photographic lens for digital cameras which has a wide angle of view, in addition to simplicity of construction and a short overall length.

BRIEF SUMMARY OF THE INVENTION

The present invention relates to a photographic lens for use in a digital camera. More particularly, the object of the invention is to provide a wide-angle, single focus lens that forms a bright image while having a simple construction and short overall length.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4C show the spherical aberration, astigmatism, and distortion, respectively, of the wide-angle, single focus lens of Embodiment 2.

DETAILED DESCRIPTION

The wide-angle, single focus lens of the present invention is formed of, in sequential order from the object side, a first lens of negative refractive power with its object side concave, a second lens of positive refractive power, with at least one of its surfaces aspheric, a third lens of negative refractive power, and a fourth lens of positive refractive power with its surface on the image side convex and at least one of its surfaces aspheric. The shape of the aspheric surfaces is given by Equation (A) below:

$$Z(h) = Ch^2/\{1+(1-KC^2h^2)^{1/2}\} + A_4 h^4 + A_6 h^6 + A_8 h^8 + A_{10} h^{10} \quad \text{Equation (A)}$$

where

Z is the length (in mm) of a line drawn from a point on the aspherical surface at distance h from the optical axis to the tangential plane of the aspherical surface vertex, C (=1/R) is the curvature of the aspherical surface near the optical axis, h is the distance (in mm) from the optical axis, K is the eccentricity, and $A_4$, $A_6$, $A_8$, and $A_{10}$ are the 4th, 6th, 8th, and 10th aspherical coefficients.

Preferably, one or more of the following Conditions (1)–(3) are satisfied:

| | |
|---|---|
| $-2.0 < f/f_1 < -0.5$ | Condition (1) |
| $0.5 < f/f_2 < 2.0$ | Condition (2) |
| $0.5 < f/f_4 < 2.0$ | Condition (3) | where f is the focal length of the wide-angle, single focus lens, $f_1$ is the focal length of the first lens in order from the object side, $f_2$ is the focal length of the second lens in order from the object side, and $f_4$ is the focal length of the fourth lens, in order from the object side.

In the wide-angle, single focus lens of the present invention, if each lens has a specified construction and satisfies Conditions (1)–(3), a bright image will be provided while maintaining both favorable correction of aberrations and a short overall length of the wide-angle, single focus lens. By making the object-side surface of the first lens in order from the object side concave, curvature of field is kept small, even at wide image angles.

It is also preferable that the wide-angle, single focus lens of the present invention be constructed with at least the first, third and fourth lenses formed of only a single lens element, and with the following Conditions (4)–(8) being satisfied:

| | |
|---|---|
| $N_d 1 < 1.65$ | Condition (4) |
| $N_d 3 > 1.70$ | Condition (5) |
| $N_d 4 < 1.65$ | Condition (6) |
| $\nu_d 3 < 50$ | Condition (7) |
| $\nu_d 4 > 50$ | Condition (8) | where $N_d 1$ the index of refraction, at the d line, of the first lens element, $N_d 3$ is the index of refraction, at the d line, of the third lens element, $N_d 4$ is the index of refraction, at the d line, of the fourth lens element, $\nu_d 3$ is the Abbe number, at the d line, of the third lens element, and $\upsilon_d 4$ is the Abbe number, at the d line, of the fourth lens element.

By satisfying the above Conditions (4)–(8) especially favorable correction of curvature of field and chromatic aberration at wide image angles is achieved.

Figure 1:
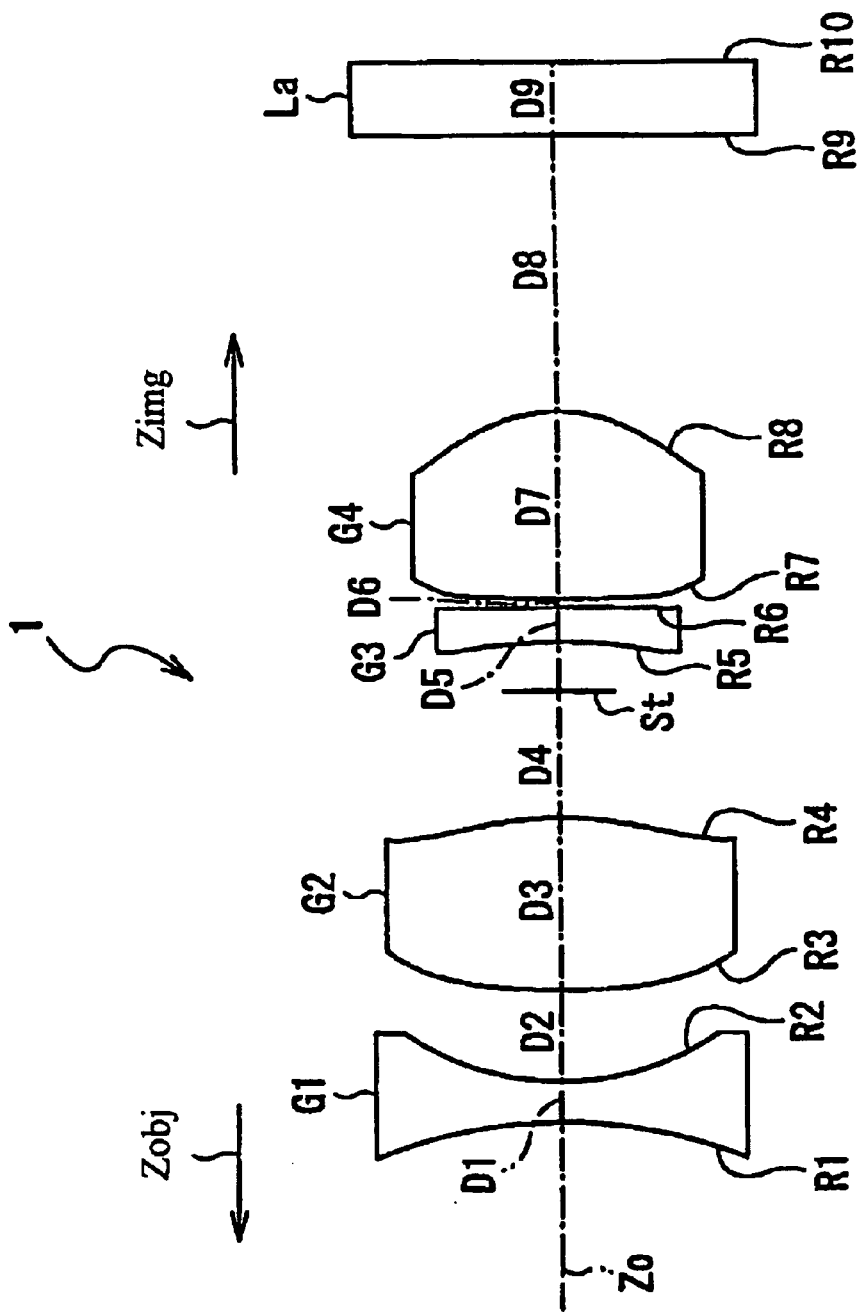
FIG. 1 shows the basic lens element configuration of a wide-angle, single focus lens of Embodiment 1 of the present invention.

The invention will first be explained in general terms. FIG. 1 shows the basic lens element configuration of a wide-angle, single focus lens 1 of an embodiment of the present invention. In FIG. 1, $Z_{OBJ}$ represents the object side and $Z_{IMG}$ represents the image side. R1 through R10 refer to the radii of curvature of the optical element surfaces, and D1 through D9 refer to the on-axis surface spacings, respectively, in order from the object side.

The wide-angle, single focus lens 1 of the embodiment shown in FIG. 1 may be used as the photographic lens of a digital camera, for example, with its image plane (not shown) positioned at the detecting surface of an image sensing device, such as a CCD array.

As shown in FIG. 1, the wide-angle, single focus lens 1 is formed of first through fourth lenses G1–G4, in sequential order from the object side along the optical axis $Z_0$. A stop St is located between the second lens G2 and the third lens G3. The wide-angle, single focus lens 1 is further equipped with a cover glass La positioned on the image side of the fourth lens G4. The cover glass La protects the surface of the image sensing device. The image side of the cover glass La is positioned so as to coincide with the image formed by the wide-angle, single focus lens. Thus, the image side of the cover glass La makes contact with the image detecting surface of the image sensing device.

The first lens G1 is of negative refractive power and is concave on the object side. In addition, this lens may be biconcave in order that it better correct for curvature of field at wide image angles.

Figure 3:
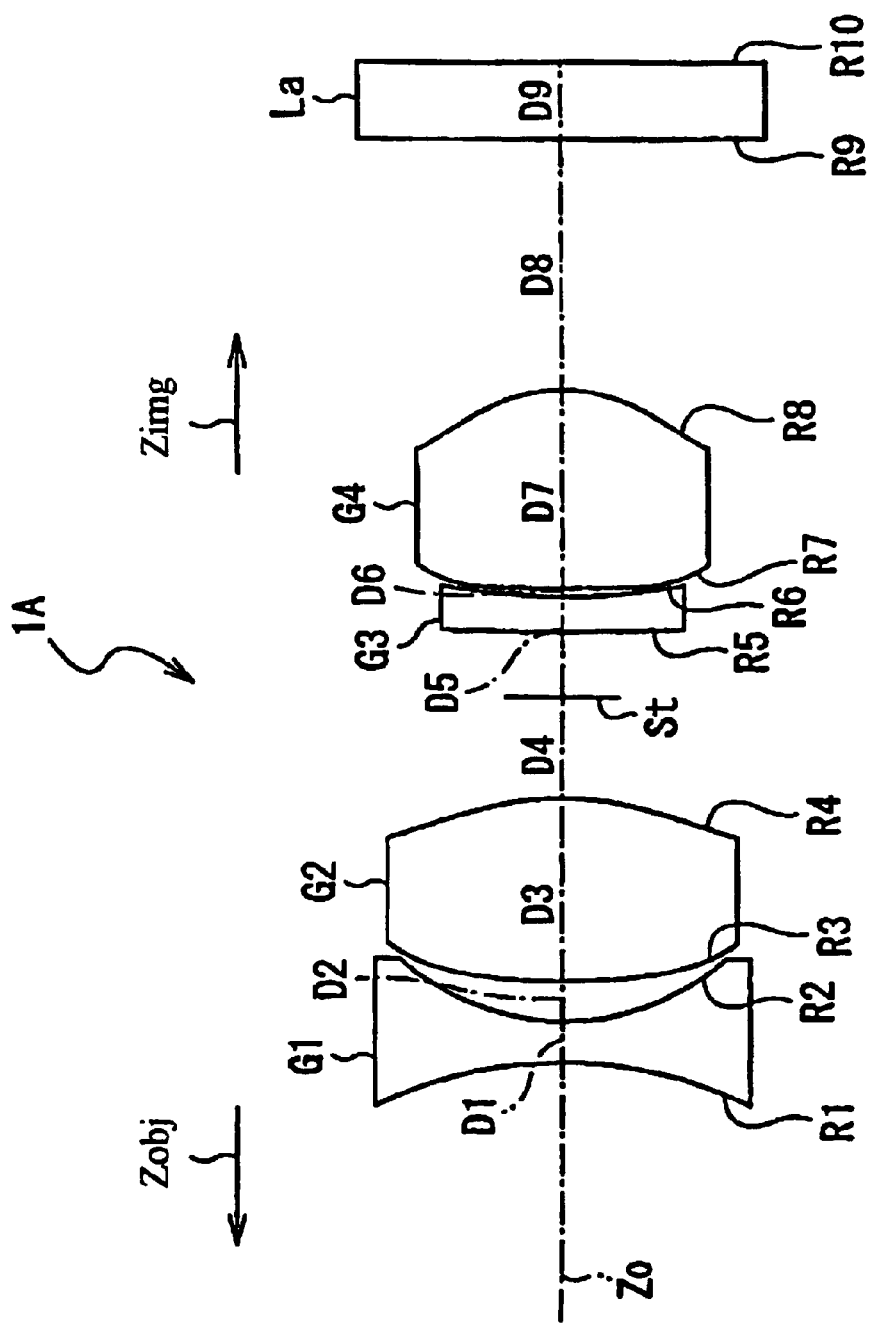
FIG. 3 shows the basic lens element configuration of a wide-angle, single focus lens of Embodiment 2 of the present invention.

The second lens G2 is of positive refractive power and is aspheric on at least one of its surfaces, and the third lens G3 is of negative refractive power. Although the third lens G3 is illustrated as being a negative meniscus lens with its concave surface on the object side in the embodiment illustrated in FIG. 1, it may instead be a negative meniscus lens with its concave surface on the image side, as illustrated in FIG. 3.

The fourth lens G4 is of positive refractive power, is convex on the image side, and is aspheric on at least one of its surfaces. It is desirable, mainly for purposes of correction of curvature of field, that the second lens G2 and the fourth lens G4 are constructed so that, when the image sides are made to be aspheric, these surfaces are convex near the optical axis and become gradually concave toward the periphery. Also, it is desirable that the second lens G2 and the fourth lens G4, which each include an aspheric surface, be molded glass lenses.

Because each of the second lens G2 and the fourth lens G4 has at least one of its surfaces aspheric, the wide-angle, single focus lens of the present invention can favorably correct the various aberrations, while being formed of only four lenses and having an overall length that is short. Also, because the first lens G1 is of negative refractive power and has its surface on the object side concave, curvature of field at wide-image angles can be minimized.

Conditions (1)–(3) are for balancing the refractive power of the first, second, and fourth lenses relative to the overall refractive power of the wide-angle, single focus lens. If these conditions are not satisfied, it becomes impossible to achieve favorable correction of the aberrations using only four lenses while providing a bright image.

Conditions (5) and (7) restrict the optical properties of the lens material of the third lens G3, and Conditions (6) and (8) restrict the optical properties of the lens material of the fourth lens G4. If these conditions are not satisfied, curvature of field and chromatic aberrations become difficult to correct, especially at the wide-angle end.

The present invention provides a wide-angle, single focus lens having a focal length f of 28 mm when scaled so as to provide an imaging lens for use with standard 35 mm film. Also, the present invention provides a wide-angle, single focus lens of simple construction and with a sufficient resolution that permits it to be used with a CCD detector array having one million pixels or more. Thus, the wide-angle, single focus lens of the present invention can be used as the imaging lens of a compact digital camera.

Two embodiments of the present invention will now be set forth in detail.

Embodiment 1

FIG. 1 shows the present invention according to a first embodiment. Because this embodiment was described above in discussing the invention in general, further description here will be omitted.

Table 1 below lists the surface number #, in order from the object side, the radius of curvature R (in mm) near the optical axis, the on-axis spacing D (in mm) between surfaces, as well as the index of refraction $N_d$ and the Abbe number $\upsilon_d$ (both at the d-line, i.e., $\lambda$=587.6 nm) of the optical materials of the wide-angle, single focus lens of Embodiment 1. Those surfaces that are aspherical in Table 1 are listed with a * to the right of the surface number. In the middle portion of the table are listed the focal length f (the table data has been normalized, for convenience, so that f equals 1 mm), the f-number $F_{NO}$, and the image angle 2ω. In the bottom portion of the table are listed the aspherical constants of the aspherical surfaces. These constants define the shape of the aspherical surfaces 3, 4, 7 and 8 according to Equation (A) above. An "E" in the data listed in the bottom portion of the table indicates that the number following the "E" is the exponent to the base 10. For example, "1.0E-02" represents the number $1.0 \times 10^{-2}$.

TABLE 1

| # | R | D | $N_d$ | $\upsilon_d$ |
|---|---|---|---|---|
| 1 | −1.8910 | 0.1566 | 1.49583 | 56.2 |
| 2 | 1.0823 | 0.3564 | | |
| 3* | 3.2472 | 0.6713 | 1.74330 | 49.2 |
| 4* | −1.3549 | 0.6943 | | |
| 5 | −2.0177 | 0.1343 | 1.9229 | 20.9 |
| 6 | −26.4449 | 0.0336 | | |
| 7* | 9.5207 | 0.7381 | 1.49700 | 81.6 |
| 8* | −0.5805 | 1.0740 | | |
| 9 | ∞ | 0.2909 | 1.51680 | 64.2 |
| 10 | ∞ | | | |

| f = 1.00 | $F_{NO}$ = 2.95 | 2ω = 71.8° | | |
|---|---|---|---|---|
| # | K | $A_4$ | $A_6$ | $A_8$ | $A_{10}$ |
| 3 | 1.00056 | 4.2858E−01 | −6.7453E−01 | 1.8195 | −1.2588 |
| 4 | 1.00456 | 5.1631E−01 | −1.0980 | 3.5182 | −2.9146 |
| 7 | 1.00038 | −4.7005E−01 | 4.8410 | −2.0694 | −6.8707 |
| 8 | 0.71565 | 3.7555E−01 | 1.4637 | −3.6114 | 1.6012E+01 |

Although the lens data above has been normalized so that f=1.00, as mentioned above, the wide-angle, single focus lens of the invention has a focal length of 28 mm when scaled for a camera using standard 35 mm film.

Table 2 below lists the values that correspond to Conditions (1)–(8) for this embodiment.

TABLE 2

| | |
|---|---|
| Condition (1) value: | $f/f_1 = -0.73$ |
| Condition (2) value: | $f/f_2 = 0.73$ |
| Condition (3) value: | $f/f_4 = 0.89$ |
| Condition (4) value: | $N_d1 = 1.49583$ |
| Condition (5) value: | $N_d3 = 1.9229$ |
| Condition (6) value: | $N_d4 = 1.49700$ |
| Condition (7) value: | $\upsilon_d3 = 20.9$ |
| Condition (8) value: | $\upsilon_d4 = 81.6$ |

As is apparent by comparing the above values with Conditions (1)–(8), each of Conditions (1)–(8) is satisfied by this embodiment.

Figure 2:
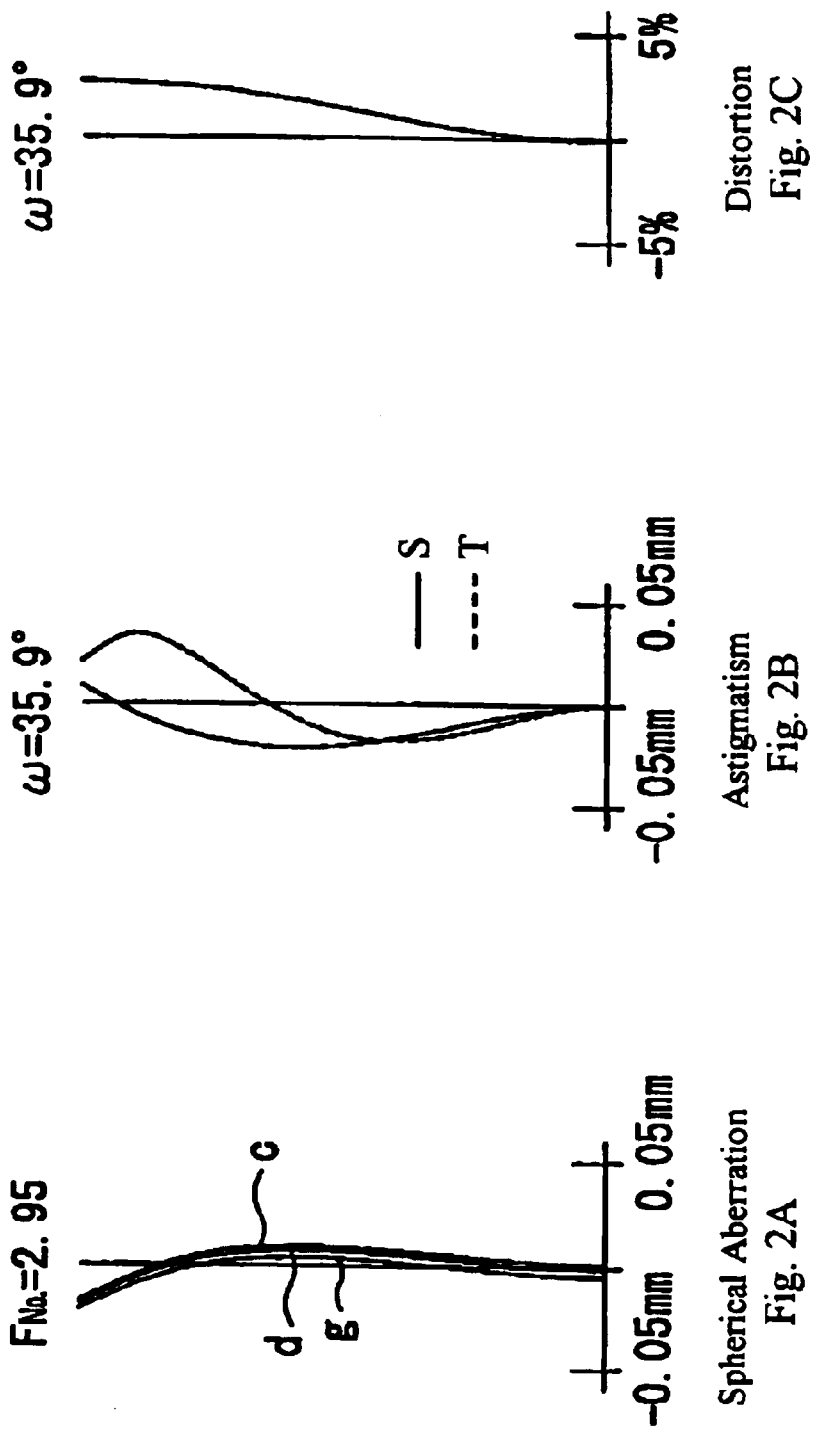
FIGS. 2A–2C show the spherical aberration, astigmatism, and distortion, respectively, of the wide-angle, single focus lens of Embodiment 1.

FIGS. 2A–2C show the spherical aberration, astigmatism, and distortion, respectively, of the optical system of the wide-angle, single focus lens of Embodiment 1. In FIG. 2A, curves are given for each of the c, d and g lines (i.e., at wavelengths 435.8 nm, 587.6 nm and 656.3 nm, respectively). In FIG. 2B, a solid line shows the astigmatism of the sagittal image surface S, and a broken line shows the astigmatism of the tangential image surface T. In these figures $F_{NO}$ represents the f-number, and ω represents the half-image angle. As is apparent from the figures, the aberrations are favorably corrected for this embodiment.

Embodiment 2

FIG. 3 shows the present invention according to a second embodiment. This embodiment is similar to that of Embodiment 1 and thus will not be separately described except to note that, in this embodiment, the third lens G3 of negative meniscus shape has its concave surface on the image side.

Table 3 below lists the surface number #, in order from the object side, the radius of curvature R (in mm) near the optical axis, the on-axis spacing D (in mm) between surfaces, as well as the index of refraction $N_d$ and the Abbe number $\upsilon_d$ (both at the d-line, i.e., λ=587.6 nm) of the optical materials of the wide-angle, single focus lens of Embodiment 2. Those surfaces that are aspherical in Table 3 are listed with a * to the right of the surface number. In the middle portion of the table are listed the focal length f (the table data has been normalized, for convenience, so that f equals 1 mm), the f-number $F_{NO}$, and the image angle 2ω. In the bottom portion of the table are listed the aspherical constants of the aspherical surfaces. These constants define the shape of the aspherical surfaces 3, 4, 7 and 8 according to Equation (A) above. An "E" in the data listed in the bottom portion of the table indicates that the number following the "E" is the exponent to the base 10. For example, "1.0E−02" represents the number $1.0 \times 10^{-2}$.

TABLE 3

| # | R | D | $N_d$ | $\upsilon_d$ |
|---|---|---|---|---|
| 1 | −1.5945 | 0.1562 | 1.51823 | 59.0 |
| 2 | 0.9375 | 0.1562 | | |
| 3* | 3.5022 | 0.7140 | 1.74330 | 49.2 |
| 4* | −1.0881 | 0.6580 | | |
| 5 | 12.6054 | 0.1339 | 1.9229 | 20.9 |
| 6 | 2.4901 | 0.0335 | | |
| 7* | 13.1652 | 0.7656 | 1.49700 | 81.6 |
| 8* | −0.6009 | 0.9371 | | |
| 9 | ∞ | 0.2901 | 1.51680 | 64.2 |
| 10 | ∞ | | | |

| | f = 1.00 | $F_{NO}$ = 2.95 | 2ω = 71.7° | |
|---|---|---|---|---|
| # | K | $A_4$ | $A_6$ | $A_8$ | $A_{10}$ |
| 3 | 1.00058 | 4.3921E−01 | −7.390E−01 | 1.9954 | −1.2459 |
| 4 | 1.06193 | 4.9801E−01 | −1.1850 | 3.3501 | −3.0140 |
| 7 | 1.00038 | −1.4781E−01 | 4.3575 | −2.2179 | −7.0543 |
| 8 | 0.80319 | 4.3212E−01 | 1.7543 | −3.9582 | 1.6421E+01 |

Although the lens data above has been normalized so that f=1.00, the above-described wide-angle, single focus lens has a focal length of 28 mm when scaled for a camera using standard 35 mm film.

Table 4 below lists the values that correspond to Conditions (1)–(8) for this embodiment.

TABLE 4

| | |
|---|---|
| Condition (1) value: | $f/f_1 = -0.90$ |
| Condition (2) value: | $f/f_2 = 0.84$ |
| Condition (3) value: | $f/f_4 = 0.85$ |
| Condition (4) value: | $N_d1 = 1.51823$ |
| Condition (5) value: | $N_d3 = 1.9229$ |
| Condition (6) value: | $N_d4 = 1.49700$ |
| Condition (7) value: | $\upsilon_d3 = 20.9$ |
| Condition (8) value: | $\upsilon_d4 = 81.6$ |

As is apparent by comparing the above values with Conditions (1)–(8), each of Conditions (1)–(8) is satisfied by this embodiment.

FIGS. 4A–4C show the spherical aberration, astigmatism, and distortion, respectively, of the wide-angle, single focus lens of Embodiment 2. In FIG. 4A, curves are given for each of the c, d and g lines (i.e., at wavelengths 435.8 nm, 587.6 nm and 656.3 nm, respectively). In FIG. 4B, a solid line shows the astigmatism of the sagittal image surface S, and a broken line shows the astigmatism of the tangential image surface T. In these figures $F_{NO.}$ represents the f-number, and ω represents the half-image angle. As is apparent from the figures, the aberrations are favorably corrected for this embodiment.

The invention being thus described, it will be obvious that the same may be varied in many ways. For example, the radii of curvature R and on-axis surface spacings D of the lens elements, which are listed above for convenience of the user for a lens having a focal length normalized to 1 mm, may be readily adjusted by those of ordinary skill in the art so as to obtain a wide-angle, single focus lens of any desired focal length. In addition, the optical materials may be modified, and one or more cemented lens elements may be substituted for a given lens element. Further, the use of the wide-angle, single focus lens of the present invention is not limited to digital cameras, as the present invention can be used as an imaging lens in other applications, such as a camera that uses silver-salt film. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A wide-angle, single focus lens comprising four lenses of negative, positive, negative, and positive refractive power, in sequential order from the object side, wherein:

the first lens is concave on the object side;

the second lens has at least one surface that is aspheric;

the fourth lens is convex on the image side and has at least one of its surfaces aspheric; and the following conditions are satisfied $$-2.0 < f/f_1 < -0.5$$

$$0.5 < f/f_2 < 2.0$$

$$0.5 < f/f_4 < 2.0$$

where f is the focal length of the wide-angle, single focus lens, $f_1$ is the focal length of the first lens, $f_2$ is the focal length of the second lens, and $f_4$ is the focal length of the fourth lens.

2. The wide angle, single focus lens as described in claim 1, wherein the first, third and fourth lenses are each formed of a single lens element and the following conditions are also satisfied:

$$N_d1 < 1.65$$

$$N_d3 > 1.70$$

$$N_d4 < 1.65$$

$$v_d3 < 50$$

$$v_d4 > 50$$

where $N_d1$ is the index of refraction, at the d line, of the first lens element, $N_d3$ is the index of refraction, at the d line, of the third lens element, $N_d4$ is the index of refraction, at the d line, of the fourth lens element, $v_d3$ is the Abbe number, at the d line, of the third lens element, and $v_d4$ is the Abbe number, at the d line, of the fourth lens element.

3. A wide-angle, single focus lens comprising four lenses of negative, positive, negative, and positive refractive power, in sequential order from the object side, wherein:

the first lens in order from the object side is concave on the object side;

the second lens in order from the object side has at least one surface that is aspheric; and the fourth lens in order from the object side is convex on the image side and has at least one surface that is aspheric; and the following condition is satisfied:

$$-2.0 < f/f_1 < -0.5$$

where f is the local length of the wide-angle, single focus lens, and $f_1$ is the focal length of the first lens.

* * * * *

UNITED STATES PATENT AND TRADEMARK OFFICE
CERTIFICATE OF CORRECTION

PATENT NO. : 6,747,816 B2
DATED : June 8, 2004
INVENTOR(S) : Sato

It is certified that error appears in the above-identified patent and that said Letters Patent is hereby corrected as shown below:

Column 2,
Line 59, change "$N_d1$ the" to -- $N_d1$ is the --;

Column 6,
Line 36, change "respectively, of the" to -- respectively, of the optical system of the --;

Column 7,
Line 19, change "The wide angle" to -- The wide-angle --; and

Column 8,
Line 28, change "is the local length" to -- is the focal length --.

Signed and Sealed this

Fourteenth Day of December, 2004

JON W. DUDAS
*Director of the United States Patent and Trademark Office*